(12) United States Patent
Schröder gen. Berghegger et al.

(10) Patent No.: US 8,582,323 B2
(45) Date of Patent: Nov. 12, 2013

(54) CONTROL CIRCUIT FOR A PRIMARY CONTROLLED SWITCHED MODE POWER SUPPLY WITH IMPROVED ACCURACY OF THE VOLTAGE CONTROL AND PRIMARY CONTROLLED SWITCHED MODE POWER SUPPLY

(75) Inventors: Ralf Schröder gen. Berghegger, Glandorf (DE); Rüdiger Malsch, Bad Schandau (DE)

(73) Assignee: Flextronics AP, LLC, Broomfield, CO (US)

( * ) Notice: Subject to any disclaimer, the term of this patent is extended or adjusted under 35 U.S.C. 154(b) by 6709 days.

(21) Appl. No.: 12/738,611

(22) PCT Filed: Oct. 13, 2008

(86) PCT No.: PCT/EP2008/008653
§ 371 (c)(1),
(2), (4) Date: Oct. 15, 2010

(87) PCT Pub. No.: WO2009/049849
PCT Pub. Date: Apr. 23, 2009

(65) Prior Publication Data
US 2011/0025286 A1 Feb. 3, 2011

(30) Foreign Application Priority Data

Oct. 17, 2007 (EP) ...................................... 07020316

(51) Int. Cl.
*H02M 3/335* (2006.01)
(52) U.S. Cl.
USPC .................................................... 363/21.12

(58) Field of Classification Search
USPC ............................................ 363/21.12–21.18
See application file for complete search history.

(56) References Cited

U.S. PATENT DOCUMENTS

| | | | |
|---|---|---|---|
| 4,273,406 A | 6/1981 | Okagami | |
| 4,370,703 A | 1/1983 | Risberg | |
| 4,563,731 A | 1/1986 | Sato et al. | |
| 4,645,278 A | 2/1987 | Yevak et al. | |
| 4,712,160 A | 12/1987 | Sato et al. | |
| 4,788,626 A | 11/1988 | Neidig et al. | |
| 4,806,110 A | 2/1989 | Lindeman | |
| 4,841,220 A | 6/1989 | Tabisz et al. | |
| 4,857,822 A | 8/1989 | Tabisz et al. | |

(Continued)

*Primary Examiner* — Jue Zhang
(74) *Attorney, Agent, or Firm* — Haverstock & Owens LLP

(57) ABSTRACT

The invention under consideration refers to a controller for a primary-side regulated control power supply unit for the regulation of the output of the primary regulated control power supply unit. The invention also concerns a method for the operation of a control power supply unit of the generic type and a pertinent control power supply unit. The controller comprises a control output (B), which can be connected with the control input of a primary-side switch (Q1) of the control power supply unit; a voltage measurement input (U), which can be connected with a primary-side auxiliary winding (L4) of a transformer (200) for the sensing of an auxiliary voltage, which is induced as a function of the secondary-side output voltage; a sample-and-hold element (SuH, SuH1) for the sensing of the auxiliary voltage; and an error amplifier (202) for a comparison of the sensed auxiliary voltage with a reference value (Vref2) and for the amplification of the deviation between the sensed auxiliary voltage and the reference value. The controller (IC2) also has a return branch for the return of the output signal of the error amplifier (202) to the voltage measurement input (U).

21 Claims, 4 Drawing Sheets

(56) References Cited

U.S. PATENT DOCUMENTS

Figure 1:
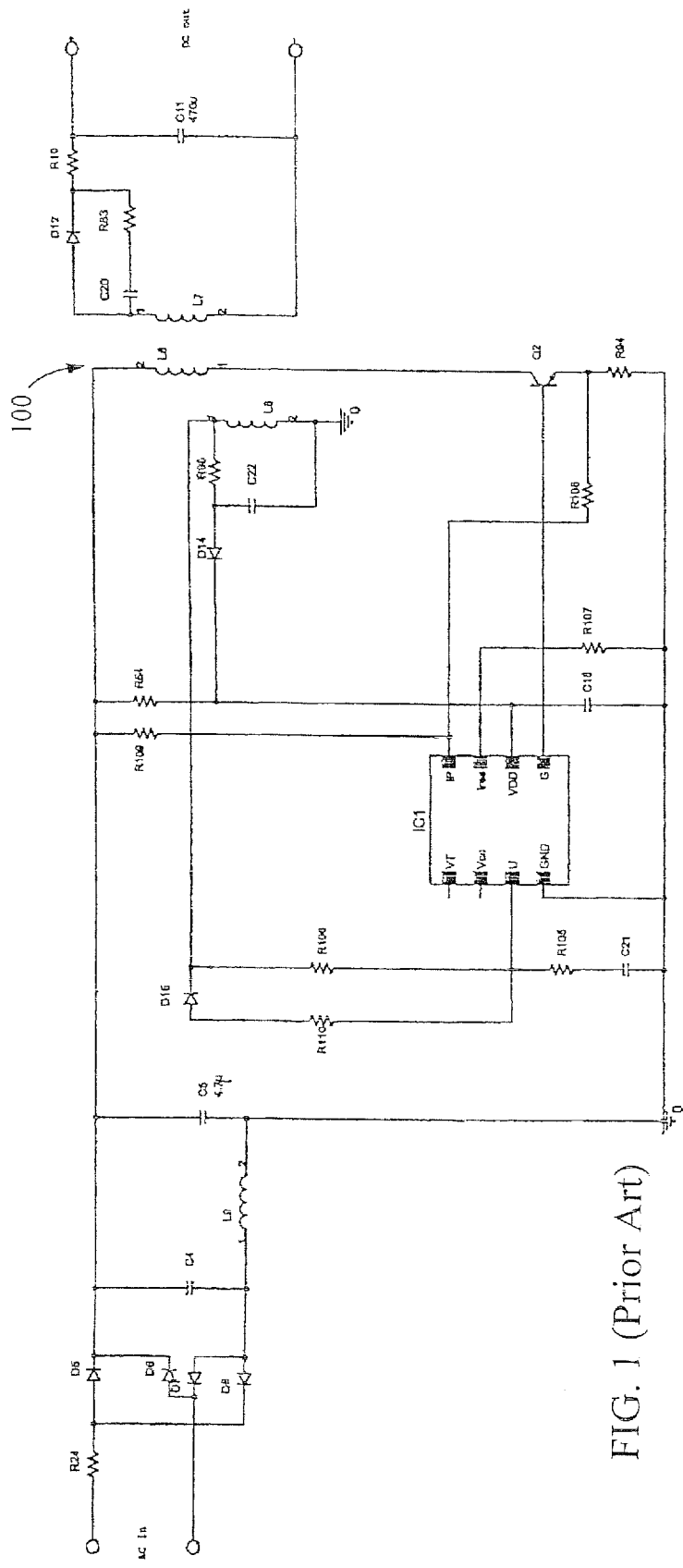

| Patent Number | | Date | Inventor(s) |
|---|---|---|---|
| 4,866,367 | A | 9/1989 | Ridley et al. |
| 4,890,217 | A | 12/1989 | Conway |
| 4,893,227 | A | 1/1990 | Gallios et al. |
| 4,899,256 | A | 2/1990 | Sway-Tin |
| 4,901,069 | A | 2/1990 | Veneruso |
| 5,065,302 | A | 11/1991 | Kanazawa |
| 5,090,919 | A | 2/1992 | Tsuji |
| 5,101,322 | A | 3/1992 | Ghaem et al. |
| 5,132,890 | A | 7/1992 | Blandino |
| 5,235,491 | A | 8/1993 | Weiss |
| 5,325,283 | A | 6/1994 | Farrington |
| 5,365,403 | A | 11/1994 | Vinciarelli et al. |
| 5,373,432 | A | 12/1994 | Vollin |
| 5,442,540 | A | 8/1995 | Hua |
| 5,673,185 | A | 9/1997 | Albach et al. |
| 5,712,772 | A | 1/1998 | Telefus et al. |
| 5,786,992 | A | 7/1998 | Vinciarelli et al. |
| 5,790,395 | A | 8/1998 | Hagen |
| 5,811,895 | A | 9/1998 | Suzuki et al. |
| 5,838,554 | A | 11/1998 | Lanni |
| 5,859,771 | A | 1/1999 | Kniegl |
| 5,923,543 | A | 7/1999 | Choi |
| 5,949,672 | A | 9/1999 | Bertnet |
| 6,009,008 | A | 12/1999 | Pelly |
| 6,091,611 | A | 7/2000 | Lanni |
| 6,183,302 | B1 | 2/2001 | Daikuhara et al. |
| 6,191,957 | B1 | 2/2001 | Peterson |
| 6,272,015 | B1 | 8/2001 | Mangtani |
| 6,275,397 | B1 | 8/2001 | McClain |
| 6,307,761 | B1 | 10/2001 | Nakagawa |
| 6,323,627 | B1 | 11/2001 | Schmiederer et al. |
| 6,385,059 | B1 | 5/2002 | Telefus et al. |
| 6,388,897 | B1 | 5/2002 | Ying et al. |
| 6,390,854 | B2 | 5/2002 | Yamamoto et al. |
| 6,396,716 | B1 | 5/2002 | Liu et al. |
| 6,452,816 | B2 | 9/2002 | Kuranaki |
| 6,459,175 | B1 | 10/2002 | Potega |
| 6,487,098 | B2 | 11/2002 | Malik et al. |
| 6,549,409 | B1 | 4/2003 | Saxelby et al. |
| 6,578,253 | B1 | 6/2003 | Herbert |
| 6,650,552 | B2 | 11/2003 | Takagi et al. |
| 6,721,192 | B1 | 4/2004 | Yang et al. |
| 6,775,162 | B2 | 8/2004 | Mihai et al. |
| 6,894,461 | B1 | 5/2005 | Hack et al. |
| 6,919,715 | B2 | 7/2005 | Muratov et al. |
| 6,958,920 | B2 * | 10/2005 | Mednik et al. ............... 363/19 |
| 6,989,997 | B2 | 1/2006 | Xu |
| 7,035,126 | B1 | 4/2006 | Lanni |
| 7,038,406 | B2 | 5/2006 | Wilson |
| 7,102,251 | B2 | 9/2006 | West |
| 7,139,180 | B1 | 11/2006 | Herbert |
| 7,202,640 | B2 | 4/2007 | Morita |
| 7,208,833 | B2 | 4/2007 | Nobori et al. |
| 7,212,420 | B2 | 5/2007 | Liao |
| 7,239,532 | B1 | 7/2007 | Hsu et al. |
| 7,274,175 | B2 | 9/2007 | Manolescu |
| 7,315,460 | B2 | 1/2008 | Kyono |
| 7,386,286 | B2 | 6/2008 | Petrovic et al. |
| 7,450,388 | B2 | 11/2008 | Beihoff et al. |
| 7,499,301 | B2 | 3/2009 | Zhou |
| 7,545,256 | B2 | 6/2009 | O'Toole et al. |
| 7,564,706 | B1 | 7/2009 | Herbert |
| 7,596,007 | B2 | 9/2009 | Phadke |
| 7,701,305 | B2 | 4/2010 | Lin et al. |
| 7,924,578 | B2 | 4/2011 | Jansen et al. |
| 8,059,434 | B2 | 11/2011 | Huang et al. |
| 8,102,678 | B2 | 1/2012 | Jungreis |
| 8,125,181 | B2 | 2/2012 | Gregg et al. |
| 8,126,181 | B2 | 2/2012 | Yamamoto et al. |
| 8,134,848 | B2 | 3/2012 | Whittam et al. |
| 8,155,368 | B2 | 4/2012 | Cheung et al. |
| 8,194,417 | B2 | 6/2012 | Chang |
| 8,207,717 | B2 | 6/2012 | Uruno et al. |
| 8,243,472 | B2 | 8/2012 | Chang et al. |
| 8,344,689 | B2 | 1/2013 | Boguslavskij |
| 8,369,111 | B2 | 2/2013 | Balakrishnan et al. |
| 8,400,801 | B2 | 3/2013 | Shinoda |
| 2002/0008963 | A1 | 1/2002 | Dibene, II et al. |
| 2002/0011823 | A1 | 1/2002 | Lee |
| 2002/0036200 | A1 | 3/2002 | Ulrich et al. |
| 2003/0035303 | A1 | 2/2003 | Balakrishnan et al. |
| 2003/0112645 | A1 | 6/2003 | Schlecht |
| 2004/0183510 | A1 | 9/2004 | Sutardja et al. |
| 2004/0252529 | A1 | 12/2004 | Huber et al. |
| 2005/0024016 | A1 | 2/2005 | Breen et al. |
| 2005/0036338 | A1 | 2/2005 | Porter et al. |
| 2005/0117376 | A1 | 6/2005 | Wilson |
| 2005/0138437 | A1 | 6/2005 | Allen et al. |
| 2005/0194942 | A1 | 9/2005 | Hack et al. |
| 2005/0225257 | A1 | 10/2005 | Green |
| 2005/0254268 | A1 | 11/2005 | Reinhard et al. |
| 2006/0002155 | A1 | 1/2006 | Shteynberg et al. |
| 2006/0022637 | A1 | 2/2006 | Wang et al. |
| 2006/0152947 | A1 | 7/2006 | Baker et al. |
| 2006/0213890 | A1 | 9/2006 | Kooken et al. |
| 2006/0232220 | A1 | 10/2006 | Melis |
| 2007/0040516 | A1 | 2/2007 | Chen |
| 2007/0120542 | A1 | 5/2007 | LeMay |
| 2007/0121981 | A1 | 5/2007 | Koh et al. |
| 2007/0138971 | A1 | 6/2007 | Chen |
| 2007/0247091 | A1 | 10/2007 | Maiocchi |
| 2007/0263415 | A1 | 11/2007 | Jansen et al. |
| 2008/0018265 | A1 | 1/2008 | Lee et al. |
| 2008/0043496 | A1 * | 2/2008 | Yang ........................ 363/21.12 |
| 2008/0191667 | A1 | 8/2008 | Kernahan et al. |
| 2009/0034299 | A1 | 2/2009 | Lev |
| 2009/0045889 | A1 | 2/2009 | Goergen et al. |
| 2009/0196073 | A1 | 8/2009 | Nakahori |
| 2009/0290384 | A1 | 11/2009 | Jungreis |
| 2009/0290385 | A1 | 11/2009 | Jungreis et al. |
| 2010/0039833 | A1 | 2/2010 | Coulson et al. |
| 2010/0289466 | A1 | 11/2010 | Telefus et al. |
| 2010/0317216 | A1 | 12/2010 | Pocrass |
| 2010/0322441 | A1 | 12/2010 | Weiss et al. |
| 2011/0132899 | A1 | 6/2011 | Shimomugi et al. |
| 2011/0261590 | A1 | 10/2011 | Liu |
| 2012/0112657 | A1 | 5/2012 | Van Der Veen et al. |

* cited by examiner

CONTROL CIRCUIT FOR A PRIMARY CONTROLLED SWITCHED MODE POWER SUPPLY WITH IMPROVED ACCURACY OF THE VOLTAGE CONTROL AND PRIMARY CONTROLLED SWITCHED MODE POWER SUPPLY

The invention under consideration refers to a controller for a primary-side regulated power supply unit to regulate the power output of the primarily regulated control power supply unit. In particular, the invention concerns a controller in a primarily regulated power supply unit that has a primary-side switch and a transformer with at least one auxiliary winding. Voltage pulses that can be used to regulate the power output are induced in the auxiliary winding by primary-side switching operations. The invention also concerns a method for the operation of a power supply unit of the generic type and a corresponding power supply unit.

Control power supply units are used in numerous electronic devices, so as to produce the low-volt direct voltage needed for the provisioning of electronic components from a supply voltage. Control power supply units have become accepted in most application cases in comparison to conventional power supply units with power transformers since they have a better efficiency after a certain power class and, in particular, small space requirements. This small space requirement is of essential importance for mobile applications and can be attributed to the fact that instead of the supply voltage, a high-frequency alternating voltage is transformed, which can be in the range of, for example, 20 kHz to 200 kHz, instead of the usual supply frequency of 50 Hz or 60 Hz. Since the required number of windings numbers of the transformer is reduced inversely proportional to the frequency, it is possible, in this way, to greatly reduce the copper losses, and the entire transformer becomes substantially smaller.

In order to further optimize the efficiency, especially primarily timed control power supply units are known, in which the frequency produced on the primary side of the high-frequency transformer by the switch, for example, a bipolar transistor, is regulated as a function of the load lying on the secondary side of the power supply unit in order to avoid a saturation of the high-frequency transformer. The feedback needed for such a regulation is implemented in that, for example, a voltage tapped off an auxiliary winding is used as a regulating variable. Such a regulating method is, for example, shown in European Patent EP 1 146 630 B1. The method described in this patent for the regulation of the output current and/or the output voltage of a control power supply unit involves charging the same energy into the transformer with each pulse.

After a fixed time, with reference to the opening of the switch, the voltage on the auxiliary winding is scanned with a sample-and-hold element (S&H element) and stored.

The disadvantage of this method, however, is that the scanning time point is of great importance for the regulating characteristics, and the shape of the voltage pulse on the auxiliary winding is greatly influenced by the different operating parameters, such as input voltage, disturbance variables, and the like. This means that a fixed value for the scanning time point greatly restricts the flexibility and operating latitude of such a regulated control power supply unit.

Therefore, an improved regulating circuit for the regulation of the power output of a primarily regulated control power supply unit was developed, which makes possible an improved regulation with a simultaneously enhanced flexibility with respect to the operating parameters. This regulating circuit, which is shown, for example, in German Patent DE 103 103 61 B4 [sic; DE 103 10 361 B4], is based on the idea that the scanning time point is determined on the basis of the duration of the voltage pulse on the auxiliary winding during a preceding control cycle.

FIG. 1 shows a circuit diagram of a control power supply unit with a regulating circuit IC1, in accordance with Patent DE 103 10 361 B4, wherein for the compensation of the voltage drop on the output line, three external components, namely, the diode D15, the resistor R110, and the capacitor C21, are provided.

The functional principle of this circuit will be explained in detail below: On pin 1 of the auxiliary winding L8 of the transformer 100, when the primary-side switch Q2 is switched on, a negative voltage arises that is proportional to the voltage on the primary-side transformer winding L6. The resistor R110 converts this voltage into a current that flows through resistor R105 into the capacitor C21.

If the primary-side switch Q2 is turned off, a positive voltage arises on pin 1 of the winding L8. This is blocked by diode D15, so that current cannot flow through resistor R10 and thus, capacitor C21 is charged.

Since the controller IC1 always switches off the primary-side switch Q2 with the same current in the primary-side winding L1, the switch-on time of the transistor Q2 is inversely proportional to the voltage on the primary-side winding L6 in the switched-on state: The following is valid:

$$U = L \cdot \frac{dI}{dt}$$

$$\Rightarrow t = L \cdot \frac{I_{max}}{U}$$

L=constant and $I_{max}$=constant, it follows that:

$$t \sim \frac{1}{U}$$

Thus, the product of the negative voltage on pin 1 of the auxiliary winding L8 and the duration of the negative pulse is independent of the voltage on the primary-side winding L6. Therefore, the following is valid:

$$U \cdot t \sim U \cdot \frac{1}{U} = konst.$$

Since the voltage on the auxiliary winding L8 is much greater than the voltage that declines on diode D15, and also much greater than the voltage that declines on capacitor C21, it is valid that the current through resistor R110 is approximately proportional to the voltage on auxiliary winding L8.

Thus, the function of this circuit is independent of the voltage on the primary-side winding L6 in the switched-on state, and the same charge is transferred to capacitor C21 with each control pulse. However, since with increasing load, the control frequency is increased, the charging current of capacitor C21 also rises with increasing load.

Capacitor C21 is discharged via the series connection of resistors R105 and R106 and auxiliary winding L8. Since the average value of the voltage on auxiliary winding L8 is 0 V, the voltage on capacitor C21 must rise with increasing charging current, so that equilibrium is retained between the charging current and the discharging current. The discharging current is calculated as:

$$I_{discharging} = \frac{U(C21)}{R105 + R106}$$

Since capacitor C21 is connected in series with the voltage divider on the voltage regulating input U of the controller IC1 (negative potential on resistor R105), the voltage is reduced on pin U by the voltage on capacitor C21. The known unit IC1 balances this in that the transferred power is increased until the voltage on pin U reaches the regulating value.

Thus, the output voltage is raised with a large load, whereas it remains almost unchanged in the no-load. The reason for this is that in the no-load, the switching frequency is so small that the voltage on capacitor C21 is almost 0 V.

The disadvantage of the known circuit shown in FIG. 1 is that with a small load it has less effect than with a large load. Therefore, the voltage drop on the output line can be balanced only in part. Otherwise, there would be regions in the output characteristic in which the voltage would rise with increasing load. This is, however, undesirable.

The goal that is the basis of the invention under consideration consists in specifying an improved controller for a primary-side regulated control power supply unit, wherein the accuracy of the voltage regulation can be increased, and, at the same time, it can be produced in a particularly low-cost and largely integratable manner.

This goal is attained with a controller and a corresponding method with the features of the independent patent claims. Advantageous refinements are the object of the dependent patent claims.

The invention under consideration is thereby based on the knowledge that by means of a return of the output signal of the error amplifier to the voltage measurement input of a particularly simple circuit integrated in an ASIC (application specific integrated circuit) together with an external capacitor and the already present external voltage divider, a continuously adjustable increase in the output voltage can be implemented as a function of the output current. In this way, the output voltage is substantially less influenced by the load present and the effects of the voltage drop on the output line can be minimized. Moreover, costs can be lessened by the integrating capacity in an ASIC.

In an advantageous embodiment of the invention under consideration, the return branch comprises a return switch and at least one resistor connected in series with the return switch. The switch can be formed, for example, by a field effect transistor.

Furthermore, the return switch can be controlled in such a manner that it conducts if a demagnetizing signal indicates that no current is flowing in the transformer. In this way, a capacitor can be charged if the error amplifier has a positive output signal without the sample-and-hold element, which records the auxiliary voltage, being impaired in its function. In an advantageous manner, the control switch is then always switched on if the voltage on the voltage measurement input falls below a prespecified reference value, and again switched off if the primary-side switch is switched off. In this way, the output voltage can be raised only a little with a large load resistor, whereas it is raised more with a low load resistor.

By wiring with a few external components and a corresponding adaptation of the same, the level of the voltage increase can be continuously adapted to the individual requirements.

A particular advantage of the solution in accordance with the invention is to be seen in that by adaptation of these external components, both the intensity of the effect as described above as well as the frequency behavior can be adapted optimally to the requirements by the external wiring. However, since all main components can be implemented in the integrated circuit, only a few external components are required. Moreover, the control unit in accordance with the invention does not need additional pins since the desired function is implemented via the measurement input of the voltage regulation that is required in any case.

Since with the circuit in accordance with the invention the maximum current in the transformer is sensed via the control output of the integrated circuit, the error caused by delay times of the detection and of the primary-side switch with different operating voltages cannot be compensated as usual by the coupling of a low operating voltage-dependent current to the measurement signal. In an advantageous embodiment of the control power supply unit in accordance with the invention, therefore, an additional transformer winding is incorporated, which causes only a very slight power loss as a result of a very small number of windings (typically only a single winding) in spite of a required current of several mA. By means of this additional auxiliary winding and a resistor connected in series, it is possible to reduce the maximum current with a high output voltage to such an extent that an almost input voltage-independent output current limitation arises.

Alternatively, of course, it would also be possible to implement the same function in the usual manner with a separate current sensing input on the integrated unit. In this way, however, the integrated unit becomes larger and more expensive.

In accordance with another advantageous embodiment of the primary-side regulated control power supply unit with a controller in accordance with the invention under consideration, the voltage derived from the output of the error amplifier overlaps the voltage on the maximum current recognition comparator. In this way, the maximum current declines with increasing output voltage of the error amplifier. Since the error amplifier has the highest output voltage with no-load, whereas it is ca. 0 V with an output voltage below the voltage regulation region, the maximum current that flows through the primary-side switch is reduced with a small load.

This solution has the following advantages. The switching frequency increases with a small load, and in this way, a quicker reaction to a load change is possible. The voltage-time converter element, which converts the output voltage of the regulating amplifier into a time pause, can be simplified since it must produce a shorter maximum time. Finally, with a small load, the flow density in the transformer declines, and audible noise can be reduced or even completely avoided.

Figure 2:
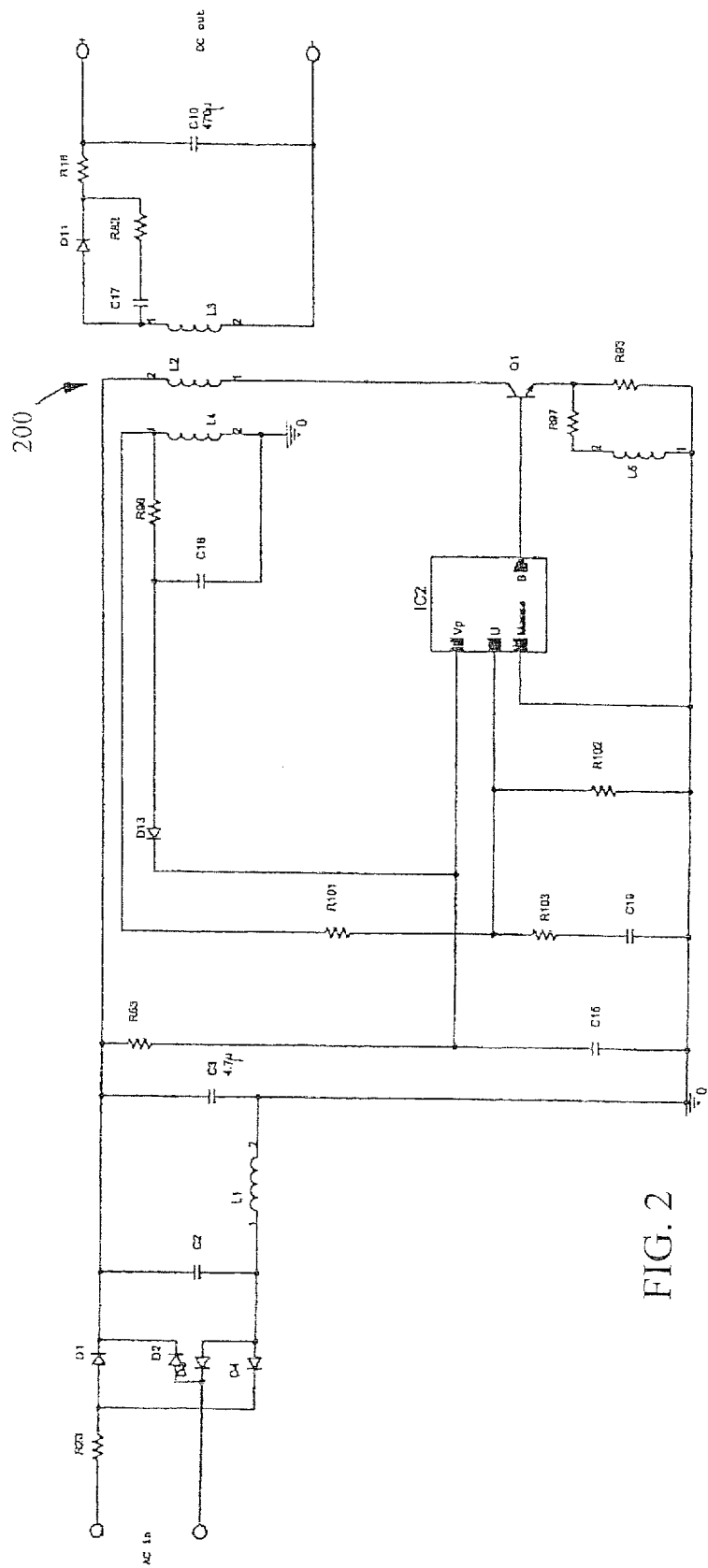
Figure 3:
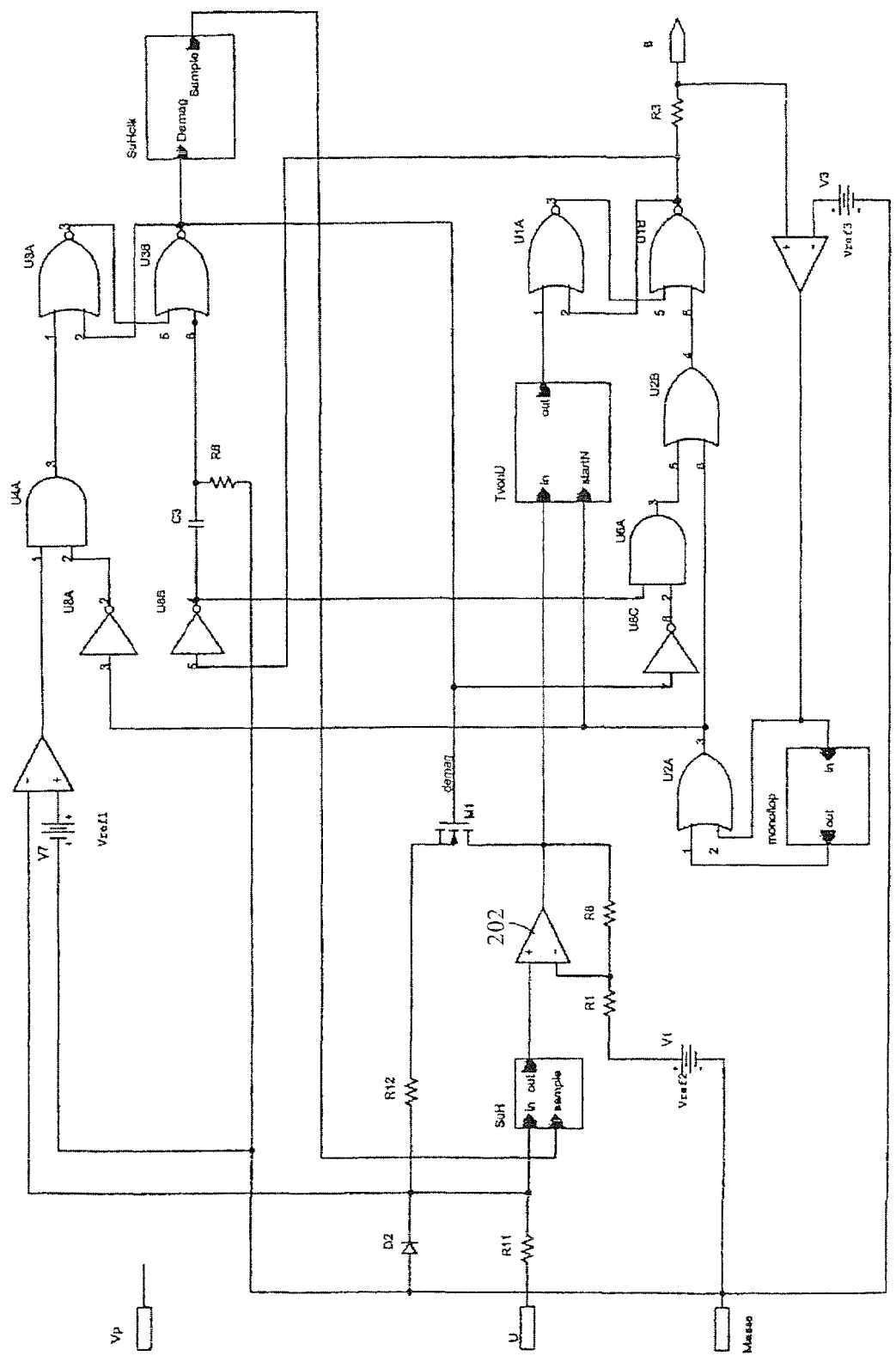
Figure 4:
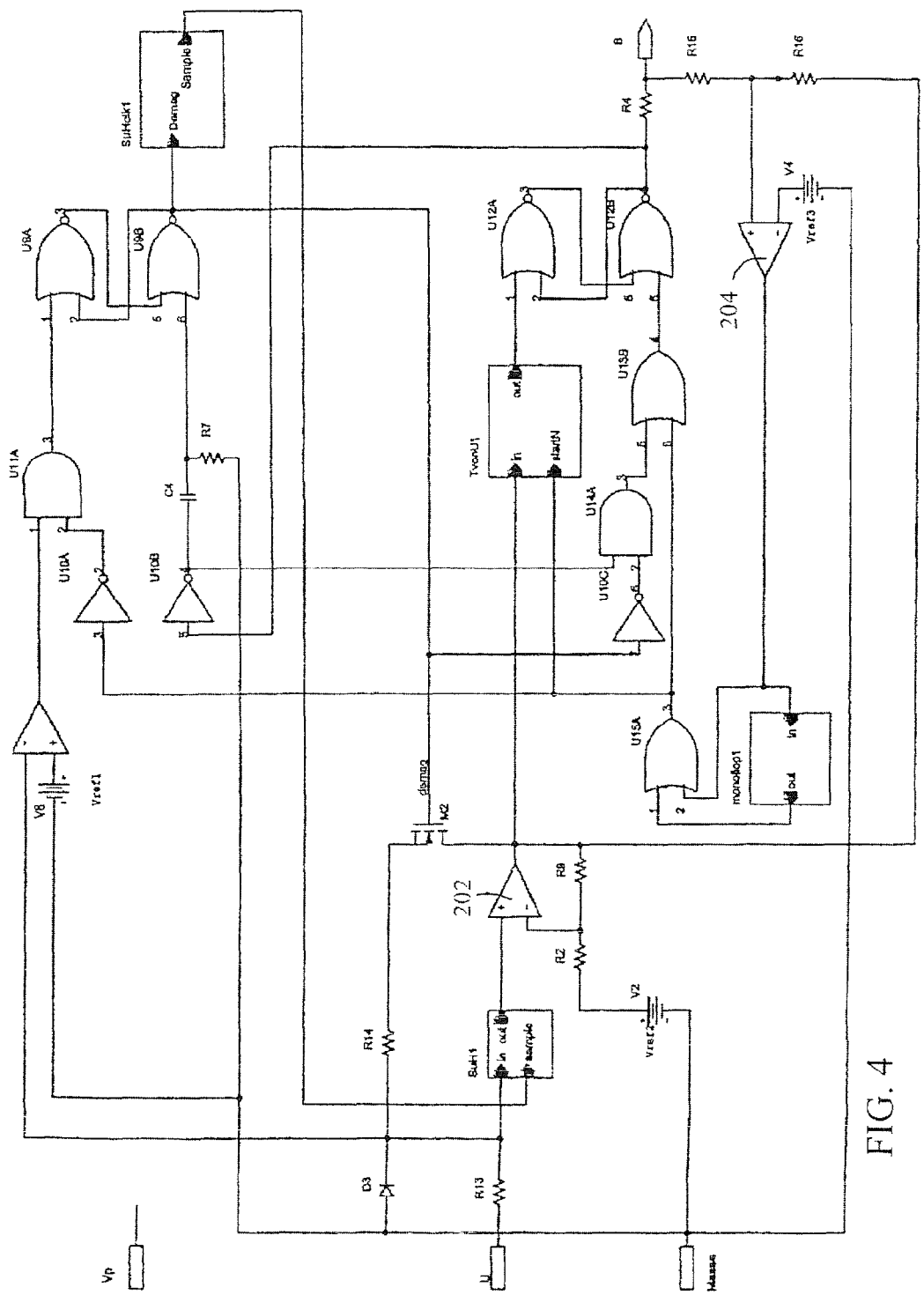

For a better understanding of the invention under consideration, it is explained in more detail with the aid of embodiment examples shown in the following figures. The same parts are provided with the same reference symbols and the same component designations. Furthermore, some features or feature combinations from the shown and described different embodiments in themselves represent solutions that are independent, inventive, or in accordance with the invention. Shown are:

FIG. 1, a circuit diagram of a control power supply unit with a controller in accordance with DE 103 103 61 B4 and a circuit for compensation of the voltage drop on the output line;

FIG. 2, a circuit diagram of a control power supply unit with a controller in accordance with the invention under consideration;

FIG. 3, a circuit diagram of the controller used in FIG. 2 in accordance with a first embodiment with a fixed current limitation;

FIG. 4, a circuit diagram of the controller used in FIG. 2 in accordance with another embodiment with a variable current limitation.

FIG. 2 shows controller IC2 in accordance with the invention in its application environment. The control power supply unit implements a similar control principle as the architecture shown in FIG. 1 in accordance with DE 103 103 61 B4. Here too, a capacitor C19 is connected in series with the voltage divider on regulation input U. In contrast to the arrangement in accordance with FIG. 1, however, the diode D15 and resistor R110 can be omitted, as will be explained in more detail below with reference to FIGS. 3 and 4. Resistor R102 connected parallel to the connection in series consisting of resistor R103 and capacitor C19 is used for the adaptation of the regulating behavior to the individual requirements, but, perhaps, can also be omitted entirely.

FIG. 3 shows the basic structure of the controller IC2 from FIG. 2 in accordance with a first embodiment. Only those circuit parts are shown that are of importance for the invention under consideration.

If the primary-side transistor Q1 (see FIG. 2) is switched off, the voltage applied on pin U, the voltage measurement input, is supplied to the sample-and-hold element SuH and stored. By means of the error amplifier 202, the output signal of the sample-and-hold element SuH is compared with a reference voltage Vref2 and the deviation is amplified. The output signal of this error amplifier 202 is supplied to a voltage-time converter TvonU and thus determines the time point at which the next switching-on of the primary-side switch Q1 will occur. This mode of working corresponds to the function of the controller from DE 103 103 61 B4.

In the control circuit in accordance with the invention, a return of the output signal of the error amplifier 202 to the voltage measurement input U is provided. In the embodiment shown here, the return branch is formed by a switch M1, a resistor R12, and a resistor R11. The switch M1 can be a field effect transistor for example. Resistor R12 can also be omitted, in that it is integrated in resistor R11. In this case, however, the sample-and-hold element SuH must have a high-ohm input.

The switch M1 is then always switched on if no current flows in transformer 200 (see FIG. 2), and then if the primary-side switch Q1 is turned on. This means that the return switch M1 is switched on if the voltage on the voltage measurement input U falls short of the reference value Vref1, and again switched off if the primary-side switch Q1 is switched off.

In this way, the charging capacitor C19 shown in FIG. 2 is charged if the error amplifier 202 has a positive output signal, without the sample-and-hold element SuH being impaired in its function. The higher the output voltage of the error amplifier 202 and the longer the time during which no current flows in the secondary winding L3 of the transformer 200, the more the capacitor C19 will be charged.

The higher the voltage on capacitor C19, the lower the output voltage, since the voltage on pin U is raised by the voltage on capacitor C19. This leads to the regulation lowering the output voltage until the voltage on the voltage measurement input U is equal to the reference voltage Vref2 during the scanning.

Thus, the output voltage is raised only slightly with a large load resistor, whereas it is raised more with a small load resistor. By adapting the external resistors R101, R103 shown in FIG. 2, and perhaps, R102, it is possible to adapt the level of the voltage increase continuously to the individual requirements. As mentioned already, a special advantage is to be found in the fact that by adaption of the external elements, the intensity of the effect on the frequency behavior can be adapted optimally to the individual requirements.

With reference to FIGS. 2 and 3, another aspect of the controller in accordance with the invention will be explained below. Since with this circuit, the maximum current in the transformer 200 is sensed via the control output B of the controller IC2, a compensation of the error that is caused by delay times of the detection and of the transistor Q1 with different operating voltages can no longer take place by coupling a low operating voltage-dependent current to the measurement signal. In order to overcome this problem, an additional transformer winding L5 was provided in the control power supply unit in accordance with the invention. This additional transformer winding has only a low number of windings, typically a single winding. Therefore, in spite of a required current of several mA, it causes only a very small power loss of the control power supply unit.

With the aid of the additional winding L5 and a resistor R97, connected parallel with it, the maximum current with a high output voltage can be reduced so that an almost input voltage-independent output current limitation can be attained.

As already mentioned, this function can of course also be implemented with the aid of a separate current sensing input on the control unit IC2, but larger dimensions and increased costs result.

Another advantageous embodiment of the controller in accordance with the invention is shown in FIG. 4. With this controller, a variable current limitation is provided in contrast to the embodiment of FIG. 3 in which the current limitation is firmly set.

In accordance with this embodiment, with the voltage divider R16, R15, a voltage derived from the output of the error amplifier 202 is overlapped with the voltage on the maximum current detector comparator 204. In this way, the maximum current declines with a rising output voltage of the error amplifier 202. Since the error amplifier 202 in no-load has the highest output voltage, whereas with an output voltage, it is at ca. 0 V below the voltage regulation area, the maximum current that flows through the switch Q1 is reduced with a low load.

As already mentioned, this procedure has, on the one hand, the advantage that the switching frequency rises with a low load and that, in this way, a quicker reaction to a load change is possible. Furthermore, the voltage-time converter element TvonU, which converts the output voltage of the error amplifier 202 into a time pause, can be simplified, since it must produce a shorter maximum time. Finally, with a low load, the flux density in the transformer declines, and audible noises can be reduced or even completely avoided.

The controller in accordance with the invention and the corresponding primary-side regulated control power supply unit, therefore, permit an increased accuracy of the voltage regulation and a compensation of the voltage drop on the output line. Furthermore, the essential components of the solution in accordance with the invention can be integrated in an ASIC and only a few external components are required. Capacitor C19 and the already present voltage dividers can be dimensioned in such a manner that the rise of the output voltage is adapted to the requirements as a function of the output current.

The invention claimed is:

1. A controller for a primary-side regulated control power supply unit, comprising:

a control output that can be connected to the control input of a primary-side switch of the control power supply unit;

a voltage measurement input for sensing of an auxiliary voltage that is induced as a function of the secondary-side output voltage, wherein the auxiliary voltage is sensed from a primary-side auxiliary winding of a transformer;

an error amplifier for a comparison of the sensed auxiliary voltage with a reference value and for the amplification of the deviation between the sensed auxiliary voltage and the reference value; and a return branch that couples the error amplifier with the voltage measurement input such that the output signal of the error amplifier is returned to the voltage measurement input, wherein the return branch comprises a return switch that conducts when the signal at the control output indicates that the primary-side switch is switched on.

2. Controller according to claim 1, also comprising a sample-and-hold element for sensing of the auxiliary voltage.

3. Controller according to claim 2, wherein the return branch has at least one return resistor connected in series with the return switch.

4. Controller according to claim 3, wherein the return switch can be controlled in such a way that it conducts when a demagnetizing signal indicates that current does not flow in the transformer.

5. Controller according to claim 4, wherein the output signal of the error amplifier also overlaps a maximum current detector comparator.

6. Controller according to claim 5, wherein the output of the error amplifier is connected to the input of the comparator via a voltage divider.

7. Controller according to claim 6, also comprising a voltage-time converter for the determination of the time point when the next switching-on of the primary-side switch will occur, as a function of the output signal of the error amplifier.

8. A primary-side regulated control power supply unit comprising:

a transformer, which has a primary-side and a secondary-side main winding;

a primary-side switch to interrupt a current that flows through the primary-side main winding;

at least one primary-side auxiliary winding, in which, after the opening of the primary-side switch, an auxiliary voltage is induced to reproduce the output voltage; and a control switch comprising:
   a control output coupled with a control input of the primary-side switch of the control power supply unit;
   a voltage measurement input coupled with the primary-side auxiliary winding of the transformer for sensing of an auxiliary voltage that is induced as a function of the secondary-side output voltage;
   an error amplifier coupled with the sensed auxiliary voltage and a reference value for the amplification of the deviation between the sensed auxiliary voltage and the reference value; and
   a return branch that couples the error amplifier with the voltage measurement input such that the output signal of the error amplifier is returned to the voltage measurement input;

wherein the transformer comprises an additional winding that is connected to a terminal with the primary-side switch and to another terminal with a ground potential.

9. Control power supply unit according to claim 8, wherein the voltage measurement input is connected to a direct voltage potential or ground potential via a charging capacitor.

10. Control power supply unit according to claim 9, wherein the primary-side auxiliary winding is connected via a series connection consisting of a first and a second resistor to a first terminal of the charging capacitor, and the voltage measurement input is connected to a common node between the first and the second resistor.

11. Control power supply unit according to claim 8, wherein the additional winding has a small number of windings, preferably a single winding.

12. Control power supply unit according to claim 11, wherein between the additional winding and the primary-side switch is a limitation resistor to limit the maximum current.

13. Control power supply unit according to claim 12, wherein a third resistor for the adaptation of the regulating behavior is located parallel to the series connection consisting of the second resistor and the charging capacitor.

14. Control power supply unit according to claim 8, wherein a current measurement resistor is located between the switch and a ground potential.

15. A method to control a primary-side switch by means of a controller in a control power supply unit with a transformer, which has a primary-side and a secondary-side main winding and at least one primary-side auxiliary winding, in which after opening the primary switch, an auxiliary voltage is induced to reproduce the output voltage, the method comprising:

controlling the primary-side switch to interrupt a current that flows through the primary-side main winding;

sensing of the auxiliary voltage on a voltage measurement input of the controller;

comparing the sensed auxiliary voltage with a reference value and amplification of the deviation between the sensed auxiliary voltage and the reference value by an error amplifier of the controller; and returning the output signal of the error amplifier to the voltage measurement input by a return branch that couples the error amplifier with the voltage measurement input, wherein the output signal of the error amplifier is returned to the voltage measurement input via a return switch that conducts if the signal on the control output indicates that the primary-side switch is switched on.

16. Method according to claim 15, wherein the sensing of the auxiliary voltage on a voltage measurement input of the controller is carried out by means of a sample-and-hold element.

17. Method according to claim 16, wherein the output signal of the error amplifier is returned to the voltage measurement input via at least one return resistor, connected in series with the return switch.

18. Method according to claim 17, wherein the return switch is controlled in such a way that it conducts if a demagnetization signal indicates that current is not flowing in the transformer.

19. Method according to claim 18, wherein the output signal of the error amplifier also overlaps a maximum current detection comparator.

20. Method according to claim 19, wherein the output of the error amplifier is connected to the input of the comparator via a voltage divider.

21. Method according to claim 20, wherein the time point when the next switching-on of the primary switch will take place is determined by means of a voltage-time converter as a function of the output signal of the error amplifier.

* * * * *